Nov. 5, 1929.  M. V. BECK  1,734,323
SPRING INNER TUBE
Filed March 26, 1928
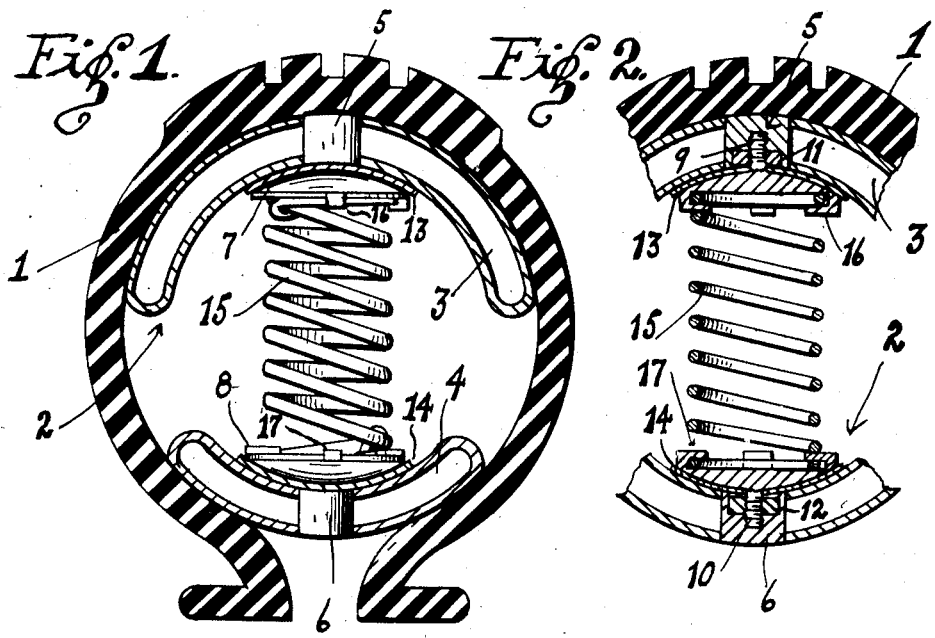
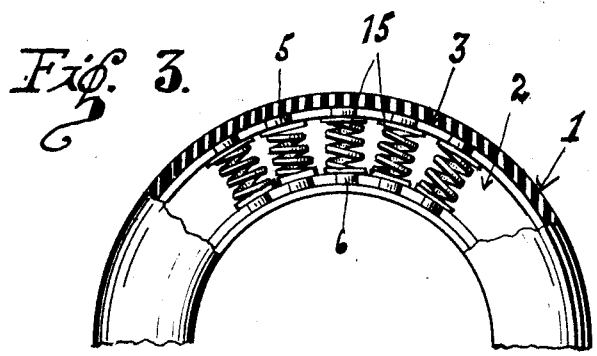
INVENTOR.
Mary Virginia Beck
BY
ATTORNEY Patented Nov. 5, 1929

1,734,323

UNITED STATES PATENT OFFICE

MARY VIRGINIA BECK, OF LONG BEACH, CALIFORNIA

SPRING INNER TUBE

Application filed March 26, 1928. Serial No. 264,589.

This invention relates to a spring inner tube which is used in place of the usual air filled tube in the well-known tire casing, and it is an object of my invention to replace the air filled inner tube with springs.

Another object of my invention is to arrange the springs between cushioned rings which are placed in the tire in the same manner as the usual inner tube.

A further object is to provide a spring inner tube of the character stated which can be readily removed for repairs when necessary.

Other objects, advantages, and features of invention may appear from the accompanying drawing, the subjoined detailed description, and the appended claims.

In the drawing:

Fig. 1 is a transverse, sectional view of a tire casing with my spring inner tube in position therein.

Fig. 2 is a fragmentary, sectional view taken transversally of the tire, through one of the spring assemblies and looking in the opposite direction from which the section in Figure 1 is viewed.

Fig. 3 is a fragmentary, side elevation of a tire with parts broken away to show interior construction.

Referring more particularly to the drawing:

The numeral 1 indicates a casing of well-known and usual construction, in which my spring inner tube 2 is adapted to be mounted. My inner tube comprises an outer ring 3 which may be of hollow construction or the like, and this ring is substantially semi-circular in cross-section, as shown in Fig. 1, so as to provide a side bearing against the tire. An inner ring 4 bears against the inside of the tire 1 and is also hollow in construction, and is arcuate in cross-section, as shown in Fig. 1. A plurality of alined rubber blocks 5, 6 are provided in the rings 3, 4, respectively, the purpose of which will be further described.

I prefer that the rings 3, 4 be formed of rubber, fiber, or a combination of rubber and fiber, and the blocks 5, 6 can thus be molded in position in the rings and effectively prevent them from loosening and falling out of place.

A pair of metal cups 7, 8 are each provided with a threaded stem 9, 10, respectively, which stems screw into nuts 11, 12, respectively, imbedded in the rubber blocks 5, 6. A rubber washer 13, 14 is provided between the metal cups 7, 8 and the rings 3, 4, respectively, thus preventing wear of the metal against the rings. A coil spring 15 is provided between each pair of cups 7, 8 and the springs 15 are preferably spaced close together so that a plurality of these springs will always be sustaining the load of the vehicle.

When the springs are all assembled in position, a homogeneous structure is provided which can be inserted in the tire at one time or removed therefrom, and thus it is not necessary to handle a large number of parts when assembling the inner resilient tube in the tire. The cups 7, 8 are provided with a plurality of tips 16, 17 which clamp over the end coil of the spring 15, thus securely holding it in position and will prevent it from being forced out of alinement when under compression during use.

The end coils of the springs 15 are preferably bent over the next adjacent coil so as to provide a flat bearing surface for the end of the spring, and thus prevent a tendency of the springs to be ejected from the cups 7, 8.

Having described my invention, I claim:

1. A spring inner tube comprising inner and outer rings of arcuate cross-section, a plurality of coil springs positioned between the rings, metal cups secured to both ends of springs, and means to secure said metal cups to the rings, said means comprising rubber blocks secured in the rings, nuts in the blocks, and threaded stems extending from the cups and screwing into the nuts.

2. A spring inner tube comprising inner and outer rings of arcuate cross-section, a plurality of coil springs positioned between the rings, metal cups secured to both ends of springs, and means to secure said metal cups to the rings, said means comprising rubber blocks secured in the rings, nuts in the blocks, and threaded stems extending from the cups and screwing into the nuts, and tips formed on the cups adapted to be bent over the end coils of the springs, thereby holding the springs in position.

In testimony whereof, I affix my signature.

MARY VIRGINIA BECK.